(12) United States Patent
Knobelspies

(10) Patent No.: US 10,734,833 B2
(45) Date of Patent: Aug. 4, 2020

(54) VOLTAGE REGULATOR OF A GENERATOR

(71) Applicant: Robert Bosch GmbH, Stuttgart (DE)

(72) Inventor: Christoph Knobelspies, Oberstenfeld (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/337,616

(22) PCT Filed: Jul. 24, 2017

(86) PCT No.: PCT/EP2017/068618
§ 371 (c)(1),
(2) Date: Mar. 28, 2019

(87) PCT Pub. No.: WO2018/059790
PCT Pub. Date: Apr. 5, 2018

(65) Prior Publication Data
US 2019/0348858 A1    Nov. 14, 2019

(30) Foreign Application Priority Data
Sep. 29, 2016   (DE) .................. 10 2016 218 798

(51) Int. Cl.
*H02J 7/24* (2006.01)
*H02H 9/04* (2006.01)
*H02J 7/14* (2006.01)
*H02J 7/16* (2006.01)
*H02P 9/10* (2006.01)
*H02P 101/45* (2016.01)

(52) U.S. Cl.
CPC ............... *H02J 7/24* (2013.01); *H02H 9/047* (2013.01); *H02J 7/1492* (2013.01); *H02J 7/166* (2013.01); *H02P 9/10* (2013.01); *H02P 2101/45* (2015.01)

(58) Field of Classification Search
CPC .......... H02J 7/24; H02J 7/1492; H02H 9/047; H02P 9/10
USPC .......................................................... 322/28
See application file for complete search history.

(56) References Cited

U.S. PATENT DOCUMENTS 4,375,015 A * 2/1983 Chambers, Jr. ........ H04B 1/586
                                                                       379/345
5,602,459 A    2/1997 Rogers
(Continued)

FOREIGN PATENT DOCUMENTS

DE    102013202197 A1    8/2014
EP       1675245 A2    6/2006
(Continued)

OTHER PUBLICATIONS

International Search Report dated Oct. 6, 2017 of the corresponding International Application PCT/EP2017/068618, filed Jul. 24, 2017.

*Primary Examiner* — Pedro J Cuevas
(74) *Attorney, Agent, or Firm* — Norton Rose Fulbright US LLP; Gerard Messina

(57) ABSTRACT

A generator has a voltage regulator that includes a first control unit for lowering an output voltage of the generator when a first maximum value is exceeded and a second control unit for lowering the output voltage either when a first maximum value is exceeded or when a second maximum value that is different from the first maximum value is exceeded.

10 Claims, 1 Drawing Sheet

(56) References Cited

U.S. PATENT DOCUMENTS

| | | | |
|---|---|---|---|
| 6,239,996 B1 | 5/2001 | Perreault et al. | |
| 7,301,310 B2* | 11/2007 | Ganev | H02P 9/48 |
| | | | 290/46 |
| 7,521,904 B2* | 4/2009 | Yoshida | H02P 9/006 |
| | | | 322/24 |
| 8,058,851 B2* | 11/2011 | Petkov | H02P 9/102 |
| | | | 322/44 |
| 8,400,121 B2* | 3/2013 | Kudo | H02M 3/1584 |
| | | | 323/266 |
| 8,421,423 B2* | 4/2013 | Nakada | H02P 9/48 |
| | | | 322/45 |
| 10,014,813 B2* | 7/2018 | Ersek | H02P 1/46 |
| 10,097,124 B2* | 10/2018 | Chassard | G05F 1/00 |
| 2004/0232538 A1 | 11/2004 | Linke | |
| 2007/0046266 A1* | 3/2007 | Ganev | H02P 9/48 |
| | | | 322/28 |
| 2008/0157725 A1* | 7/2008 | Yoshida | H02J 7/1461 |
| | | | 322/24 |
| 2008/0191482 A1* | 8/2008 | Okuno | H02P 9/48 |
| | | | 290/7 |
| 2010/0066314 A1* | 3/2010 | Petkov | H02P 9/102 |
| | | | 322/68 |
| 2011/0068752 A1* | 3/2011 | Nakada | H02P 9/48 |
| | | | 322/28 |
| 2011/0101940 A1* | 5/2011 | Kudo | H02M 3/158 |
| | | | 323/282 |
| 2016/0181963 A1* | 6/2016 | Ersek | H02P 1/46 |
| | | | 318/519 |
| 2017/0163025 A1* | 6/2017 | Schmidt | H02P 9/006 |
| 2018/0083560 A1* | 3/2018 | Chassard | G05F 1/00 |
| 2020/0036219 A1* | 1/2020 | Yoon | H02J 7/243 |

FOREIGN PATENT DOCUMENTS

| | | |
|---|---|---|
| EP | 1696554 A2 | 8/2006 |
| JP | 2000032671 A | 1/2000 |
| JP | 2007288927 A | 11/2007 |
| JP | 2008172851 A | 7/2008 |

* cited by examiner

VOLTAGE REGULATOR OF A GENERATOR

CROSS-REFERENCE TO RELATED APPLICATIONS

The present application is the national stage of International Pat. App. No. PCT/EP2017/068618 filed Jul. 24, 2017, and claims priority under 35 U.S.C. § 119 to DE 10 2016 218 798.8, filed in the Federal Republic of Germany on Sep. 29, 2016, the content of each of which are incorporated herein by reference in their entireties.

FIELD OF THE INVENTION

The present invention relates to a voltage regulator of a generator and to a generator that includes such a voltage regulator.

BACKGROUND

It is common to use generators for providing electrical energy in motor vehicles. The generator converts mechanical energy, which is supplied from the drive motor of the vehicle via a belt pulley, into electrical energy. The torque driving the generator is thus a function of a state of the internal combustion engine.

Generators are generally coupled to a voltage regulator, which is supplied with power from the generator's own voltage and/or from the vehicle electrical system. Control devices are generally used in this generator, usually in the form of integrated circuits that are designed with a power electronics system. The control devices set the current that is required in the electrical system of the vehicle, depending on the requirements of the electrical consumers and the charging strategies of the battery of the vehicle. For this purpose, the vehicle electrical system voltage is used as a control variable and is continuously compared to a setpoint voltage. A vehicle electrical system voltage is in particular identical to an output voltage of the generator.

In particular, a voltage regulator is known from EP 1 675 245 A2. This voltage regulator includes two switches. A first switch ensures that a vehicle electrical system voltage is maintained in the event of slight variations. If the vehicle electrical system voltage increases sharply due to various circumstances, such as in particular switching off an energy-intensive consumer, the second switch is used to rapidly lower the generator voltage. Thus, a threshold value at which the second stage becomes active must be significantly above the threshold value of the first stage. This has the disadvantage that in the event that a defect occurs at the first switch and it can no longer carry out its control tasks, the second switch can only hold the vehicle electrical system voltage at a higher level. This can potentially result in damage within the vehicle electrical system.

SUMMARY

A voltage regulator according to the present invention advantageously allows the electrical system voltage of a vehicle to be held at a level that is safe for components of the vehicle electrical system. The voltage regulator advantageously dispenses with additional connections for obtaining additional signals, since these result in computing time and additional costs. At the same time, reliable control of the vehicle electrical system voltage is made possible.

The voltage regulator is of a generator and includes a first control unit and a second control unit that is independent from the first control unit. The first control unit is designed for lowering an output voltage of the generator when a first maximum value is exceeded. The second control unit is likewise designed for lowering the output voltage of the generator. It is provided that this lowering takes place either when the first maximum value is exceeded or when a second maximum that is different from the first maximum value is exceeded. The second control unit can thus preferably take over two different tasks. When the second control unit is used as a component that is connected downstream from the first control unit, in particular a voltage regulator of the type from the related art is implementable. This means that the first control unit is configured for holding the output voltage at a predefined value or in a predefined interval. This is achieved in particular by lowering the output voltage when it reaches an excessively high value. The second control unit is then advantageously usable to rapidly lower an excessive increase in the output voltage. However, if the first control unit fails, the second control unit can take over the task of the first control unit. This prevents the output voltage of the generator from remaining at an excessively high level in the event of a defect in the first control unit.

It is preferably provided that the first control unit and the second control unit are designed for influencing an excitation voltage of an excitation winding of the generator, which is used as a manipulated variable. In particular, the output voltage of the generator is easily controllable via the excitation voltage, since a lower level of electrical power is transported by the excitation winding than can be delivered by the generator. If the output voltage were used as a manipulated variable, a high level of electrical power would have to be processed, which is avoided by providing the excitation voltage as a manipulated variable. The voltage regulator can thus have a simple and cost-effective design. In particular, power semiconductors, which need only withstand low levels of electrical power, can be used.

The second control unit in a normal state is preferably designed for lowering the output voltage when the second maximum value is exceeded. For lowering the output voltage when the first maximum value is exceeded, the second control unit is preferably designed to do so only when a defect is present at the first control unit. This ensures that during normal operation, the second control unit together with the first control unit represents a stepped controller. As a result, during normal operation primarily the first control unit is active, and the second control unit intervenes only when the first control unit is no longer functioning correctly. Only in the event of a defect in the first control unit does the second control unit take over the tasks of the first control unit. A stepped controller is thus no longer present, although it is still ensured that the output voltage of the generator is lowered even when it exceeds the first maximum value. Without such an adaptation, the second control unit would continue to lower the voltage only when the second maximum value was exceeded, which in particular could result in a continuous excessive voltage within the vehicle electrical system. Such a risk is thus avoided.

A defect at the first control unit is advantageously recognized by the output voltage being above a predefined value over a predefined time period. Since the first control unit is designed for lowering the output voltage when it exceeds the first maximum value, a defect in the first control unit can be deduced when this task is no longer performed by the first control unit. The second control unit is thus designed for also lowering the output voltage when, over the predefined time period, it is above the first maximum value or is above a second minimum value that is less than the second maximum value but greater than the first maximum value. The second minimum value is used as the threshold for deactivating the second control unit, as described below. A predefined time period can be regarded in particular as a time period of at least one-half second. The voltage regulator thus requires no additional components for monitoring the first control unit; instead, the second control unit itself can recognize when a defect is present in the first time period.

The second maximum value is preferably greater than the first maximum value. A stepped controller is thus implementable in which the second control unit does not intervene until the voltage is above an upper limit that is represented by the second maximum value. Below the upper limit, it is to be assumed that controlling the output voltage can be carried out by the first control unit. However, if the second maximum value is exceeded, an excessive increase in the voltage within the vehicle electrical system is to be assumed, which can occur in particular due to switching off a consumption-intensive consumer. In this case, the output voltage is rapidly lowerable by the second control unit in order to return to a range in which the output voltage can be controlled by the first control unit.

The first control unit preferably includes a first switching unit, while the second control unit preferably includes a second switching unit. The excitation winding is dischargeable by the first switching unit and by the second switching unit. The output voltage is thus lowerable by discharging the excitation winding. Discharging the excitation winding takes place using a characteristic discharge curve. This discharge curve is a function of a time constant, so that a rapid discharge is not always possible. Therefore, the discharge takes place by both the first control unit and the second control unit.

It is particularly advantageous for the first control unit to include a first logic unit, and the second control unit to include a second logic unit. It is provided that the first control unit and the second control unit are configured for detecting the output voltage. Thus, the output voltage is individually detectable by each logic unit. An exchange of data between the first control unit and the second control unit preferably does not take place. Instead, both the first control unit and the second control unit operate autonomously, and thus allow redundancy to be provided within the voltage regulator. The first logic unit is designed for switching the first switching unit when the output voltage exceeds the first maximum value, and when the output voltage drops below a first minimum value that is less than the first maximum value. The switching (off) thus preferably takes place for discharging the excitation winding when the output voltage exceeds the maximum value. If the output voltage drops below the first minimum value, further discharging of the excitation winding is no longer necessary. In this case, an additional switching (on) of the first switching unit takes place, so that discharging of the excitation winding is terminated. The second logic unit is designed for either switching the second switching unit when the output voltage exceeds the first maximum value and when the output voltage drops below the first minimum value, or alternatively, when the output voltage exceeds the second maximum value and when the output voltage drops below a second minimum value. It is provided that the second minimum value is less than the second maximum value. In particular, it is also provided that the second minimum value is greater than the first maximum value. This in turn ensures that the second control unit can selectively take over the tasks of the first control unit when it is defective, or alternatively represents a downstream control for the first control unit. For this purpose, the second logic unit can selectively switch the second control unit between the first maximum value and the first minimum value, and between the second maximum value and the second minimum value.

The first switching unit is designed for switching an electrical connection between a first connecting point of the excitation winding and a positive terminal of the generator. The second switching unit is designed for switching an electrical connection between a second connecting point of the excitation winding and a negative terminal of the generator. The excitation winding extends between the first connecting point and the second connecting point.

It is particularly advantageous for the first control unit to also include a first blocking unit. In an example, the first blocking unit is a diode. The first blocking unit is situated between the first connecting point and the negative terminal, and blocks a current flow from the first connecting point to the negative terminal. The second control unit includes a second blocking unit that is situated between the second connecting point and the positive terminal. The second blocking unit blocks a current flow from the positive terminal to the second connecting point. The second blocking unit is also preferably designed as a diode. A total of two freewheels are thus defined within the voltage regulator. These two freewheels are activated or deactivated by switching the first switching unit and the second switching unit, and thus represent the option for lowering the output voltage of the generator. A first freewheel is activated by separating the connection between the positive terminal and the first connecting point, by switching the first switching element. In this case, a freewheel takes place through the excitation winding, the second connecting point, the second switching element, the first blocking element, and lastly, via the first connecting point back to the excitation winding. A second freewheel is activated by separating the electrical connection between the second connecting point and the negative terminal, by switching the second switching device. In this case, a freewheel takes place from the excitation winding via the second connecting point, the second blocking unit, the vehicle electrical system, the first blocking unit, and via the first connecting point back to the excitation winding.

The present invention also relates to a generator that includes this type of voltage regulator. In particular, such a generator is usable in a vehicle as a generator. Use of the above-described voltage regulator ensures that the output voltage, and thus, a voltage within an electrical system of the vehicle, is not continuously above the first maximum value. A defect in components within the vehicle electrical system is thus avoided.

Example embodiments of the present invention are explained in greater detail below, with reference to the appended drawings.

DETAILED DESCRIPTION

Figure 1:
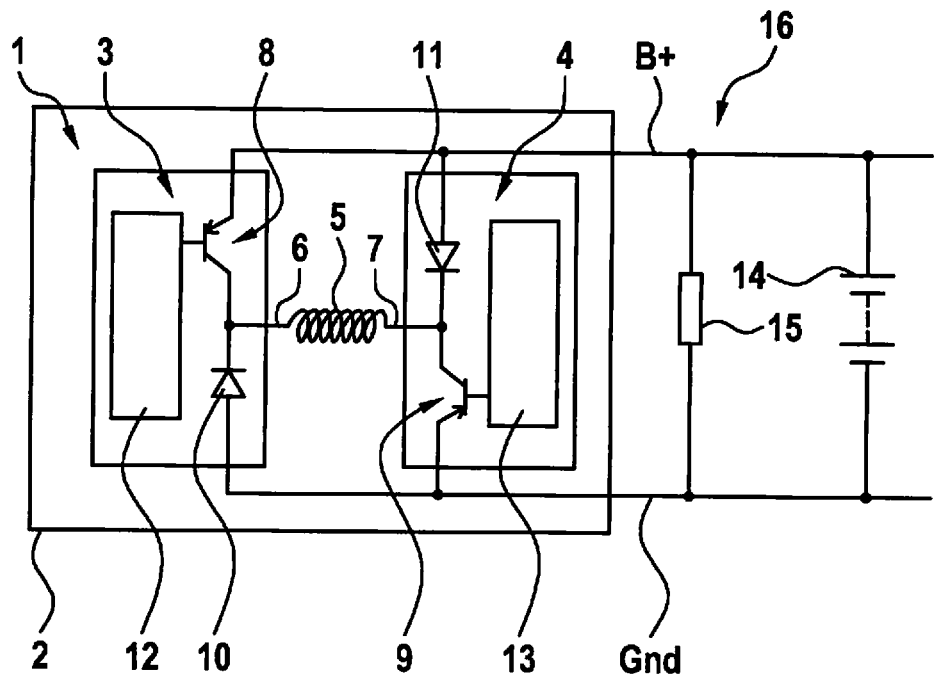
FIG. 1 schematically illustrates a generator that includes a voltage regulator according to an example embodiment of the present invention.

FIG. 1 schematically shows a voltage regulator 1 that is situated in a generator 2. The winding 5 of generator 2 is illustrated. A rotor and a stator of the generator for converting mechanical energy into electrical energy are not illustrated. A vehicle electrical system 16 is suppliable with electrical energy via generator 2, vehicle electrical system 16 being illustrated by a vehicle battery 14 and a consumer 15. Vehicle electrical system 16 includes a positive terminal B+ and a negative terminal GND. Vehicle electrical system 16 is electrically connected to generator 2, and thus to voltage regulator 1, via positive terminal B+ and negative terminal GND. An output voltage of generator 2 thus also represents a voltage within vehicle electrical system 16.

Voltage regulator 1 includes a first control unit 3 and a second control unit 4. First control unit 3 in turn includes a first logic unit 12 via which a first switching unit 8 is switchable. In addition, first control unit 3 includes a first blocking element 10. First switching unit 8 connects a first connecting point 6 of excitation winding 5 to positive terminal B+. The electrical connection of first connecting point 6 to positive terminal B+ can thus be established or separated by first switching unit 8. First connecting point 6 is connected to negative terminal GND via first blocking unit 10, first blocking unit 10 blocking a current flow from first connecting point 6 to negative terminal GND. First blocking unit 10 is in particular a diode.

Second control unit 4 includes a second logic unit 13. A second switching device 9 is switchable via second logic unit 13. In addition, second control unit 4 includes a second blocking unit 11.

An electrical connection between a second connecting point 7 of excitation winding 5 and negative terminal GND can be selectively established or separated via second switching unit 9. An electrical connection between second connecting point 7 and positive terminal B+ is present via second blocking unit 11, second blocking unit 11 blocking a current flow from positive terminal B+ to second connecting point 7.

During normal operation, first switching unit 8 and second switching unit 9 are both closed, so that an electrical contact is present between first connecting point 6 and positive terminal B+ and between second connecting point 7 and negative terminal GND. Excitation winding 5 extends between first connecting point 6 and second connecting point 7. The output voltage of generator 2 can be controlled by opening the first switching unit 8 and second switching unit 9.

The open/closed state of the switching units 8 and 9 can be controlled as follows. The output voltage of generator 2 is monitored by first logic unit 12. As soon as the output voltage exceeds a first maximum value 100, first logic unit 12 opens first switching unit 8. As soon as the output voltage drops below a first minimum value 300, first switching unit 8 is once again closed by first logic unit 12.

Second control unit 4 basically operates according to the same principle. Thus, second logic unit 13 is configured to open second switching unit 9 when the output voltage exceeds first maximum value 100, and to close second switching unit 9 when the output voltage drops below first minimum value 300. In addition, second logic unit 13 is designed to open second switching unit 9 when the output voltage exceeds a second maximum value 200, and to close second switching unit 9 when the output voltage drops below a second minimum value 400. The selection of whether to use first maximum value 100 and first minimum value 300, or instead, second maximum value 200 and second minimum value 400, depends on whether a defect has been detected at first control unit 3.

In a normal state in which first control unit 3 has no defects, second logic unit 13 uses second maximum value 200 and second minimum value 400. Second maximum value 200 and second minimum value 400 are in particular greater than first maximum value 100. Second control unit 4 thus represents a downstream control stage for first control unit 3. A lowering of the output voltage by first control unit 3 is based on a discharge of excitation coil 5, which extends between first connecting point 6 and second connecting point 7. When first switching unit 8 is switched to separate an electrical connection between positive terminal B+ and first connecting point 6, excitation winding 5 is discharged or de-energized. Thus, due to the lower excitation voltage, a lower output voltage of generator 2 is also present. However, a discharge of excitation coil 5 takes place using a predefined, specific discharge curve, in particular a time constant being present. Due to this discharge curve, a rapid discharge of excitation coil 5 is not possible. Thus, rapid lowering of the output voltage by first control unit 3 is not possible. However, during normal operation this is not necessary.

In particular, a freewheel is activatable by switching first switching device 8. This freewheel takes place from excitation winding 5 to second connecting point 7, second switching element 9, first blocking element 10, and lastly, via first connecting point 6 back to excitation winding 5.

However, if the output voltage of generator 2 increases sharply, which can occur in particular when an energy-intensive consumer 15 within vehicle electrical system 16 is switched off, there is the risk that an excessively high voltage could remain within vehicle electrical system 16 over an excessively long time period, as a result of which components within vehicle electrical system 16 can be damaged. Therefore, second switching device 9 is opened by second logic unit 13 for the case that the output voltage exceeds second maximum value 200. A more rapid discharge of excitation winding 5 thus takes place.

As the result of switching second switching device 9, a freewheel takes place from excitation winding 5 via second connecting point 7, second blocking unit 11, vehicle electrical system 16, first blocking unit 10, and via first connecting point 6 back to excitation winding 5.

However, if a defect is present within first control unit 3, second logic unit 13 is designed to switch second switching device 9 as a function of first maximum value 100 and first minimum value 300. Second control unit 4 thus takes over the tasks of first control unit 3 and holds the output voltage at a level that would not damage components of vehicle electrical system 16. The situation is thus avoided that an intervention by voltage regulator 1 take places only at higher second maximum value 200. Instead, an intervention by voltage regulator 1 always takes place at first maximum value 100, regardless of whether or not first control unit 3 is defective.

Figure 2:
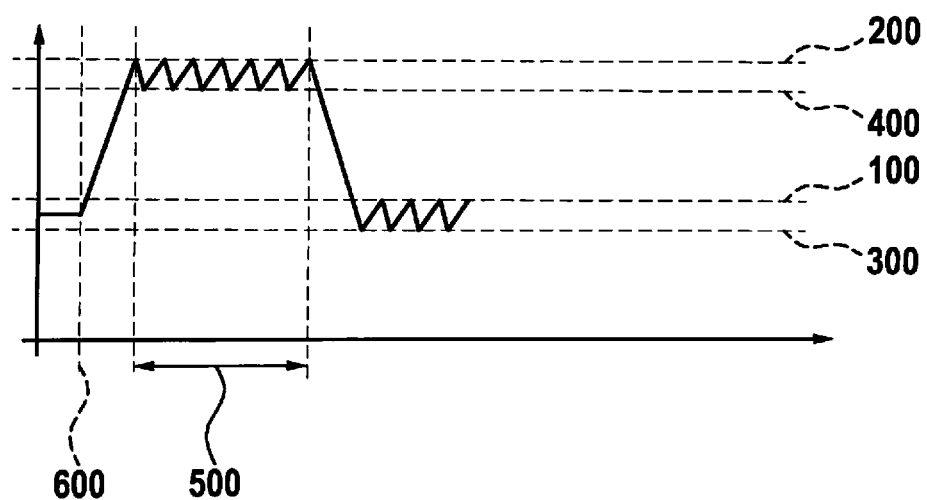
FIG. 2 is a diagram that illustrates output voltage during a control by a voltage regulator according to an example embodiment of the present invention.

FIG. 2 schematically shows a case in which, due to a defect in first control unit 3, second control unit 4 changes from second maximum value 200 and second minimum value 400 to first maximum value 100 and first minimum value 300. A curve of the output voltage of generator 2 is illustrated in the shown diagram. A defect in first control unit 3 occurs at a starting time 600. This means that first switching unit 8 is continuously closed and is no longer opened. The output voltage thus increases until second control unit 4 intervenes at second maximum value 200. However, since second control unit 4 once again closes second switching unit 9 when the output voltage drops below second minimum value 400, since in this case it can be assumed that control of the output voltage can now once again be taken over by first control unit 3, the output voltage once again increases due to defective first control unit 3. As soon as the output voltage has again reached second maximum value 200, a new intervention by second control unit 4 takes place by opening of second switching device 9. The output voltage is thus always held between second minimum value 400 and second maximum value 200.

Due to second control unit 4, in particular due to second logic unit 13, a time period is also recognizable within which the output voltage is above first maximum value 100. In particular, this time can be estimated by how long the output voltage is above second minimum value 400, which is detectable by second control unit 9. As soon as this time period exceeds a predefined time period 500, in particular a time period of greater than 0.5 seconds, second logic unit 13 assumes a defect in first control unit 3. Thus, second control unit 4 does not require any additional components to recognize a defect in first control unit 3.

As soon as such a defect has been recognized, second logic unit 13 uses only first maximum value 100 and first minimum value 300 for controlling the output voltage. Thus, second switching unit 9 is opened when first maximum value 100 is exceeded, and is closed when the value drops below first minimum value 300. In this way, the same control function is achievable as with first control unit 3. This ensures that the output voltage remains not between second minimum value 400 and second maximum value 200, but, rather, between first minimum value 300 and first maximum value 100.

In an example embodiment, first maximum value 100 is 14.2 volts, second maximum value 200 is 16.2 volts, first minimum value 300 is 14.0 volts, and second minimum value 400 is 16.0 volts. Thus, during normal operation, voltages above 16.0 volts can be rapidly lowered, while in the event of a defect in first control unit 3, the output voltage of generator 2 does not continuously increase above 14.2 volts. In this way, on the one hand redundancy within voltage regulator 1 is present, and on the other hand, voltage regulator 1 can be used as a stepped controller.

What is claimed is:

1. A voltage regulator of a generator, the voltage regulator comprising:
   a first control unit; and
   a second control unit;
   wherein:
      the first control unit is configured to recognize that an output voltage of the generator has exceeded a first maximum value and lower the output voltage in response to the recognition that the output voltage has exceeded the first maximum value; and
      the second control unit is configured to (a) recognize that the output voltage has exceeded the first maximum value and lower the output voltage in response to the recognition that the output voltage has exceeded the first maximum value and also (b) recognize that the output voltage has exceeded a second maximum value that is different from the first maximum value and lower the output voltage in response to the recognition that the output voltage has exceeded the second maximum value.

2. The voltage regulator of claim 1, wherein the first control unit and the second control unit are configured to influence an excitation voltage of an excitation winding of the generator, which is used as a manipulated variable.

3. The voltage regulator of claim 1, wherein the second control unit is configured to lower the output voltage when the second maximum value is exceeded in a normal state and to lower the output voltage when the first maximum value is exceeded in an error state when a defect is present at the first control unit.

4. The voltage regulator of claim 3, wherein the second control unit is configured to recognize the defect at the first control unit when the output voltage is above a predefined value over a predefined time period.

5. The voltage regulator of claim 1, wherein the second maximum value is greater than the first maximum value.

6. The voltage regulator of claim 1, wherein the first control unit includes a first switching unit, the second control unit includes a second switching unit, and the excitation winding is dischargeable by the first switching unit and the second switching unit.

7. The voltage regulator of claim 6, wherein:
   the first control unit includes a first logic unit that is configured to detect the output voltage and to switch the first switching unit when the output voltage exceeds the first maximum value or drops below a first minimum value that is less than the first maximum value; and
   the second control unit includes a second logic unit that is configured to detect the output voltage and to switch the second switching unit:
      when the output voltage exceeds the first maximum value;
      when the output voltage drops below the first minimum value;
      when the output voltage exceeds the second maximum value; and
      when the output voltage drops below a second minimum value that is less than the second maximum value.

8. The voltage regulator of claim 6, wherein the first switching unit is configured to switch an electrical connection between a first connecting point of the excitation winding and a positive terminal of the generator, and the second switching unit is configured to switch an electrical connection between a second connecting point of the excitation winding and a negative terminal of the generator.

9. The voltage regulator of claim 8, wherein the first control unit includes a first blocking unit situated between the first connecting point and the negative terminal and that blocks a current flow from the first connecting point to the negative terminal, and the second control unit includes a second blocking unit that is situated between the second connecting point and the positive terminal and that blocks a current flow from the positive terminal to the second connecting point.

10. A generator comprising:
   a voltage regulator that includes a first control unit and a second control unit, wherein:
      the first control unit is configured to recognize that an output voltage of the generator has exceeded a first maximum value and lower the output voltage in response to the recognition that the output voltage has exceeded the first maximum value; and
      the second control unit is configured to (a) recognize that the output voltage has exceeded the first maximum value and lower the output voltage in response to the recognition that the output voltage has exceeded the first maximum value and also (b) recognize that the output voltage has exceeded a second maximum value that is different from the first maximum value and lower the output voltage in response to the recognition that the output voltage has exceeded the second maximum value.

\* \* \* \* \*